Figure 1:
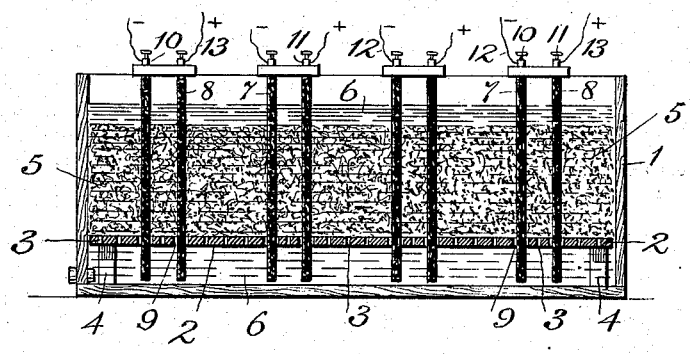

No. 840,511. PATENTED JAN. 8, 1907.
R. L. PACKARD.
EXTRACTING METALS FROM SULFID ORES.
APPLICATION FILED JAN. 11, 1906.

Witnesses
Inventor
R. L. Packard
By E. W. Cady
Attorney

UNITED STATES PATENT OFFICE.

ROBERT L. PACKARD, OF WASHINGTON, DISTRICT OF COLUMBIA.

EXTRACTING METALS FROM SULFID ORES.

No. 840,511.     Specification of Letters Patent.     Patented Jan. 8, 1907.

Application filed January 11, 1906. Serial No. 295,651.

*To all whom it may concern:*

Be it known that I, ROBERT L. PACKARD, a citizen of the United States, residing at Washington, District of Columbia, have invented certain new and useful Improvements in Extracting Metals from Sulfid Ores, of which the following is a specification.

This invention relates to the treatment of sulfid ores, particularly sulfids of copper and zinc, in the wet way, whereby the said sulfids are converted into sulfates and the metals of such sulfates as are soluble are brought into solution and are subsequently recovered.

Copper and zinc are usually obtained from their sulfid ores by some smelting process, which is sometimes preceded by roasting, and sometimes the ores are roasted to a certain point and then treated in the wet way. The roasting of sulfid ores is essentially an oxidizing process and may be carried so far as to eliminate all or nearly all the sulfur and leave the metals as oxids, or it may be so conducted as to convert them into sulfates. In either case expensive furnaces, costly fuel, and skilled labor are necessary to carry out the process, and only ores of sufficiently high value to yield a profit over and above the expense of the metallurgical operations, plus the cost of transportation, can be smelted. By my invention furnaces and their attendant expenses are dispensed with, so that ores of copper of too low grade to bear the cost of transportation and smelting can be profitably treated at the mines.

My invention consists, essentially, in oxidizing the sulfur of sulfid ores, and thereby converting their metals into sulfates by means of chlorin set free in or acting upon an acid solution containing the pulverized unroasted ore.

Chlorin may be introduced from without into the mass of unroasted ore immersed in water or may be generated in intimate contact with the particles of ore by placing the latter in a solution capable of yielding chlorin, such as a soluble hypochlorite, and then adding acid thereto; but I prefer to generate and introduce the chlorin directly into the body of the unroasted ore by means of the electric current acting upon the solution in which the ore is immersed. The solution may be a strong solution of hydrochloric acid (muriatic acid, as known in trade) or a strong brine kept acid by hydrochloric or sulfuric acid. The current acting upon this solution sets free chlorin, which in the presence of water combines with hydrogen and liberates oxygen, which oxidizes the sulfur of the ores, converting the sulfids into sulfates. Theoretically only a relatively small quantity of chlorin would be necessary for this conversion, as is shown by the equation:

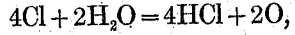
$$4Cl + 2H_2O = 4HCl + 2O,$$

the chlorin set free by the current forming hydrochloric acid and free oxygen, the acid thus produced being capable of again furnishing chlorin, which thus travels in a cycle. The oxygen being liberated in the "nascent state" in immediate contact with the sulfid particles oxidizes energetically. The hypochlorites and chlorates formed in this process are acted upon by the free mineral acid of the solution, which liberates their acid radicals to aid powerfully in oxidizing the sulfids. This theoretical condition is not fully realized, however, in practice, and therefore an excess of acid must be present to dissolve the metallic oxids, (and carbonates,) which may be in excess of the sulfur in combination. The conversion of the sulfur of the sulfids into sulfuric acid, however, furnishes enough of that acid to prevent the consumption of any large quantity of free acid.

In the accompanying drawings I have illustrated apparatus for carrying out my invention, in which—

Figure 2:
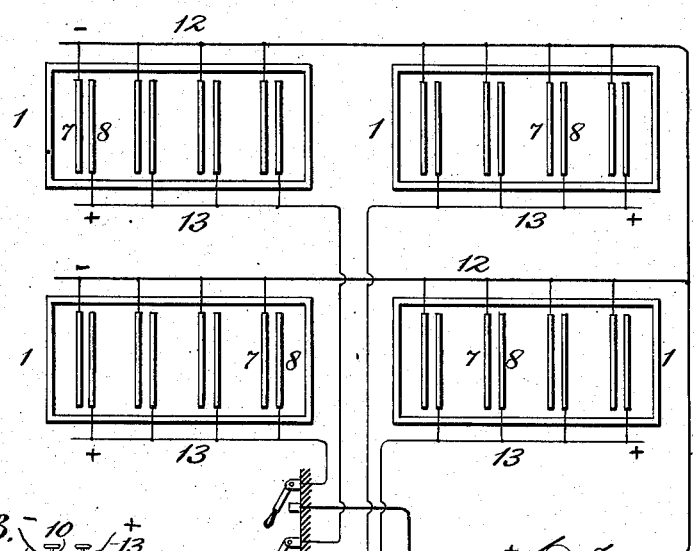
Figure 3:
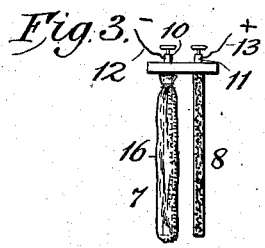

Figure 1 is an elevation in longitudinal section of a tank for treating the crushed ore. Fig. 2 is a diagrammatic view of a number of tanks, showing them electrically connected. Fig. 3 is a detail view showing an anode and cathode, with the cathode enveloped in a linen cloth.

In carrying out my invention as applied to the extraction of copper from sulfid ores the ore is first crushed to a suitable fineness, say forty mesh or finer. Then without concentrating it is ready to be placed in the tanks or vats for treatment. The size and number of the tanks will depend upon the quantity of ore to be treated daily and the means of supplying the current. In remote places, at small mines, small independent generators run by gasolene-engines can be employed. They would necessarily be as light as possible on account of transportation, and in such places small tanks would be used. On the other hand, at centers where sufficient power is available or where current is supplied on the large scale large tanks like those used in cyaniding might be used with correspondingly large generators. A tank four feet by four feet by two feet could treat, say, a ton of crushed ore. Taking such a tank to illustrate the process, it may be provided with a perforated removable false bottom, so arranged that the anodes and cathodes may pass through it and reach to the bottom of the tank. In the absence of such a false bottom a layer of coarse gravel two or three inches deep should be placed in the tank in order to allow some depth of electrolyte below the ore. This should be covered with straw or cheese-cloth to keep the ore separate to some extent. Next arrange in the tank for anodes a series of carbon plates or carbon rods nearly as high as the tank, connected together at the top by a suitable conductor extending from one side to the other of the tank and reaching to the bottom thereof and alternating with these and at intervals of about two or three inches from them other carbon plates or series of rods to serve as cathodes. As it is not intended or desired to deposit copper upon these cathodes, the object being merely to generate chlorin in this tank, they may have a much less surface than the anodes, and sheet-copper or even iron may be used in place of carbon. The anodes and cathodes should be connected independently to conductors outside the tank leading to the proper poles of the generator. The cathodes should preferably be enveloped in linen cloths to retain the copper which is precipitated loosely upon them. The pulverized ore is now introduced and covered with the electrolyte, care being taken not to allow the latter to reach the conductors at the top of the carbon. All metallic connections inside the tank should be varnished to protect them from the corrosive action of the fumes of chlorin. The current is now turned on and the chlorin is at once liberated and begins its action, and copper sulfate appears in the solution. As copper sulfid ores contain iron, sulfate of iron is also formed and goes into the solution.

1 is the tank, having its top open and its sides, ends, and bottom formed of suitable material.

2 is the removable false bottom, having perforations 3 and resting on suitable supports 4 on the bottom of the tank 1, so as to form a space between the two bottoms to allow some depth of the electrolyte below the ore.

The crushed ore 5 is shown as resting on the false bottom 2 in the electrolyte 6.

7 and 8 are the anodes and cathodes arranged in pairs and extending through openings 9 in the perforated bottom 2 from top to bottom of the tank 1. The anodes 7 and 8 are independently electrically connected by means of the binding-posts 10 and 11 to conductors 12 and 13, leading to the poles of a generator 14.

In Fig. 2 I have shown a number of tanks in which the anodes and cathodes are so electrically connected and a switchboard 15 for cutting in and out the current to the different tanks.

In Fig. 3 is shown a cathode enveloped in a linen cloth 16.

The current for the tank described should be of low voltage—say two or three—but of sufficient amperage to generate a considerable volume of chlorin in a short time, say two hundred amperes. The current can be turned off from one tank when the fluid is saturated with chlorin and resumed again at will, being meanwhile turned on to another tank. After two or three hours a sample of the ore is taken out of the tank, washed, and tested for copper. If any is found, the action is allowed to continue until further tests show that the ore is free from copper. The anodes and cathodes are then lifted out. The solution is tapped off from a plug-hole near the bottom of the tank through a cloth filter into a large shallow precipitating-tank made to receive the solutions from a number of chloridizing-tanks. Scrap-iron is placed in this tank, upon which the copper is precipitated in the form of sponge or cement copper, which is collected and may be shipped to a smelter or refinery, or, if facilities exist, it may be melted and run into ingots or shapes suitable for anodes and sold in that form. The solution may be used over and over again.

In centers where there are facilities for electrodepositing copper the precipitation by iron scrap might be dispensed with and the copper solution be run directly into vats used for electrodeposition and there deposited if it were found feasible to do so.

If the copper ore contains gold, the action of the current should be stopped long enough before tapping to insure the complete chloridizing and solution of the gold, some of which may have been precipitated at the cathode by the reducing action of the ferrous salt formed there. The chlorin will convert the ferrous into a ferric salt and dissolve the gold. The gold may be precipitated by the addition of ferrous sulfate to the solution in a separate tank previous to the precipitation of the copper.

A relatively deep tank with vertical anodes and cathodes has been described as being better adapted to the present purpose. It would not of course be a departure from the invention to use tanks with the anodes and cathodes arranged horizontally.

Although this process is described as applied to the treatment of low-grade unconcentrated ore, it is evident that it will operate as well upon twenty-per-cent. ore and concentrates as upon two-per-cent. ore.

By this process zinc sulfid is converted into sulfate and passes into solution in the same way as copper. The zinc may be recovered from the solution by electrodeposition and subsequent melting. The sulfids carrying nickel and cobalt are also oxidized into sulfates in the same way as those containing copper and zinc, and the metals go into solution, the nickel or cobalt being separated from the iron contained in the solution by chemical reagents and electrodeposition.

Having now described my invention, what I claim, and desire to secure by Letters Patent, is—

1. The process herein described of extracting metals from sulfid ores, which consists in converting the sulfids into sulfates by subjecting a body of unroasted pulverized sulfid ore, freely distributed throughout a suitable acidified solution, to the action of chlorin saturating said solution and recovering the metals from said solution.

2. The method herein described of extracting metals from sulfid ores, which consists in converting the sulfids into sulfates by placing unroasted pulverized sulfid ore, freely distributed throughout an acid electrolyte bath, capable of yielding chlorin and then subjecting said electrolyte to the action of an electric current until the entire electrolyte bath is saturated with chlorin.

3. The process herein described of extracting metals from sulfid ores, which consists in converting the sulfids into sulfates, by placing and freely distributing unroasted pulverized sulfid ore in an acidified chlorid solution, and passing an electric current through said solution until the entire solution is saturated with chlorin.

4. The herein-described process of extracting metals from sulfid ores, containing gold, which consists in converting the sulfids into sulfates by placing the unroasted pulverized sulfid ore, freely distributed throughout an electrolytic bath, capable of yielding chlorin; subjecting said electrolyte to the action of an electric current until the entire electrolyte bath is saturated with chlorin; interrupting the current to permit the chlorin to oxidize the iron salts and effect a complete solution of the gold, and then drawing off and precipitating the gold.

In testimony whereof I have signed my name to this specification in the presence of two subscribing witnesses.

ROBERT L. PACKARD.

Witnesses:
SAMUEL C. ROSS,
EDWARD W. CADY.